United States Patent
Riedl et al.

(10) Patent No.: US 9,533,714 B2
(45) Date of Patent: Jan. 3, 2017

(54) FRONT-END BODY

(71) Applicant: Bayerische Motoren Werke Aktiengesellschaft, Munich (DE)

(72) Inventors: Wilhelm Riedl, Pfaffenhofen (DE); Uwe Koehler, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/731,990

(22) Filed: Jun. 5, 2015

(65) Prior Publication Data

US 2015/0274211 A1 Oct. 1, 2015

Related U.S. Application Data

(63) Continuation of application No. PCT/EP2013/074472, filed on Nov. 22, 2013.

(30) Foreign Application Priority Data

Dec. 7, 2012 (DE) .................. 10 2012 222 561

(51) Int. Cl.
*B62D 25/08* (2006.01)
*B62D 21/15* (2006.01)

(52) U.S. Cl.
CPC ........... *B62D 25/084* (2013.01); *B62D 21/152* (2013.01); *B62D 25/085* (2013.01)

(58) Field of Classification Search
CPC ..... B62D 25/08; B62D 25/082; B62D 25/084; B62D 25/085; B62D 25/088; B62D 21/152

(Continued)

(56) References Cited

U.S. PATENT DOCUMENTS 4,428,447 A * 1/1984 Malen .................. B62D 25/084
165/53
6,293,615 B1 * 9/2001 Tarahomi ............. B62D 25/084
180/68.4

(Continued)

FOREIGN PATENT DOCUMENTS

DE    10 2006 008 667 A1    9/2007
DE    10 2011 016 936 A1    12/2011

(Continued)

OTHER PUBLICATIONS

International Search Report (PCT/ISA/210) dated Feb. 6, 2014 with English translation (five pages).

(Continued)

*Primary Examiner* — Gregory Blankenship
(74) *Attorney, Agent, or Firm* — Crowell & Moring LLP (57) ABSTRACT

A front-end body is provided for a front end of a motor vehicle, wherein the front-end body has a first lateral supporting element and a second lateral supporting element. The lateral supporting elements are to be attached to a reference strut, which is provided on a base body, in order to align the front-end body with the base body. A transverse strut arrangement connects the first lateral supporting element and the second lateral supporting element such that an accommodation space, which is open in the vertical direction of the front-end body for accommodating an assembly, in particular a radiator assembly is formed between the first lateral supporting element and the second lateral supporting element. A stability element is detachably attached to the transverse strut arrangement at one end and can be indirectly or directly attached to the base body at the other end.

20 Claims, 7 Drawing Sheets

(58) Field of Classification Search
USPC .. 296/187.09, 193.09, 203.02; 180/68.4–68.6
See application file for complete search history.

(56) References Cited

U.S. PATENT DOCUMENTS

| | | | | |
|---|---|---|---|---|
| 6,450,276 | B1* | 9/2002 | Latcau | B62D 25/084 180/68.1 |
| 6,517,146 | B1* | 2/2003 | Cheron | B62D 25/084 180/68.4 |
| 6,547,317 | B1* | 4/2003 | Cheron | B62D 25/084 180/68.4 |
| 6,814,400 | B2* | 11/2004 | Henderson | B62D 29/001 180/68.4 |
| 7,114,587 | B2* | 10/2006 | Mori | B60K 11/04 180/68.3 |
| 7,497,289 | B2* | 3/2009 | Kwun | B62D 25/084 180/68.4 |
| 8,167,068 | B2* | 5/2012 | Riviere | B60K 11/04 180/68.4 |
| 8,561,741 | B2* | 10/2013 | Kurokawa | B60K 11/08 180/68.4 |
| 8,789,874 | B2* | 7/2014 | Okamura | B60R 19/12 180/68.4 |
| 9,126,633 | B2* | 9/2015 | Cho | B62D 25/08 |
| 9,290,207 | B2* | 3/2016 | Cho | B62D 25/085 |
| 2004/0222670 | A1* | 11/2004 | Andre | B62D 25/084 296/193.09 |
| 2006/0081354 | A1* | 4/2006 | Miura | B62D 25/084 165/41 |
| 2008/0308333 | A1* | 12/2008 | Kapadia | B60K 11/04 180/68.4 |
| 2009/0212600 | A1* | 8/2009 | Fischer | B62D 25/084 296/193.09 |
| 2010/0080013 | A1* | 4/2010 | Riviere | B62D 25/084 362/523 |
| 2010/0163324 | A1 | 7/2010 | Jyoutaki et al. | |
| 2010/0253102 | A1* | 10/2010 | Riviere | B60R 19/12 293/121 |
| 2011/0037292 | A1* | 2/2011 | Owen | B62D 25/084 296/193.09 |
| 2012/0043051 | A1* | 2/2012 | Kurokawa | B60K 11/08 165/41 |
| 2012/0091760 | A1* | 4/2012 | Dupont | B62D 25/084 296/193.09 |
| 2013/0292969 | A1 | 11/2013 | Metzner et al. | |
| 2014/0132033 | A1* | 5/2014 | Townson | B62D 25/084 296/193.1 |
| 2015/0274211 | A1* | 10/2015 | Riedl | B62D 25/084 296/187.09 |

FOREIGN PATENT DOCUMENTS

| | | |
|---|---|---|
| DE | 10 2010 044 221 A1 | 3/2012 |
| DE | 10 2010 052 510 A1 | 5/2012 |
| JP | 2010-184530 A | 8/2010 |
| WO | WO 2009/071244 A1 | 6/2009 |

OTHER PUBLICATIONS

German Search Report dated Sep. 9, 2013 with partial English translation (10 pages).

* cited by examiner

FRONT-END BODY

CROSS REFERENCE TO RELATED APPLICATIONS

This application is a continuation of PCT International Application No. PCT/EP2013/074472, filed Nov. 22, 2013, which claims priority under 35 U.S.C. §119 from German Patent Application No. 10 2012 222 561.7, filed Dec. 7, 2012, the entire disclosures of which are herein expressly incorporated by reference.

BACKGROUND AND SUMMARY OF THE INVENTION

The invention relates to a front-end body for the construction of a front end of a motor vehicle.

A front-end body for the construction of a front end for a motor vehicle is known, for example, from patent document WO 2009/071244. The front-end body described therein is shown schematically in FIG. 7 together with a base body.

Figure 7:
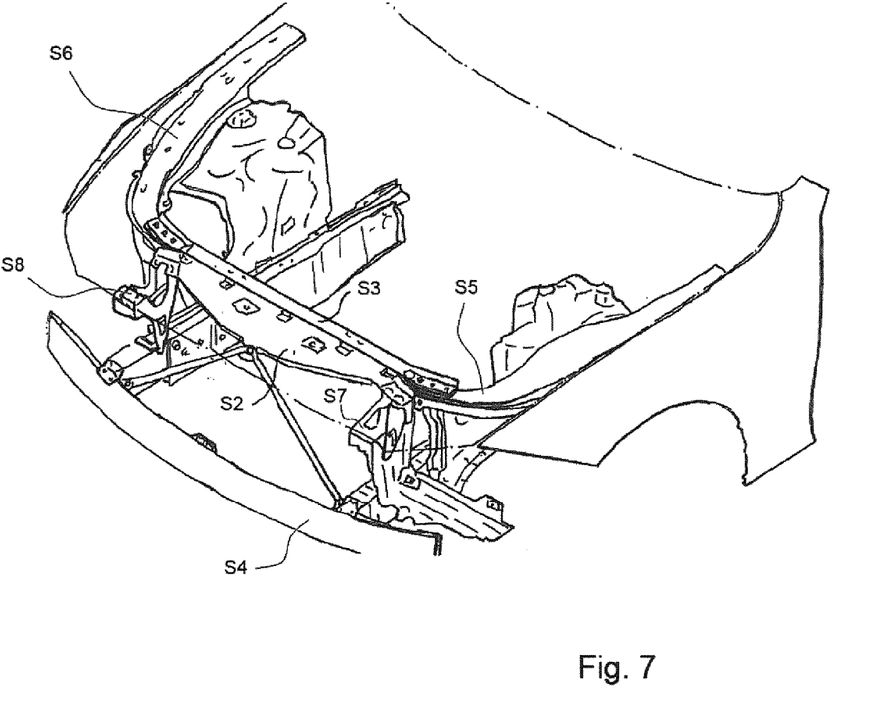
FIG. 7 shows a front end body according to the prior art.

The front-end body known from the prior art includes two lateral supporting elements S7, S8 which are connected to each other via a connecting plate S2, wherein the connecting plate S2 spans the space located between the supporting elements. The supporting elements S7, S8 are held by a crash system S4 located at the lower, front end of the front-end body.

A V-shaped strut which runs to the crash system S4 and is fastened thereto is fastened to an upper, front end of the connecting plate S2.

The front-end body formed in such a manner is suitable for the construction of a modular front end which comprises, for example, bumper, headlights, radiator grill, etc.

In order for the front-end body to be able to be connected to the base body shown schematically in FIG. 7, a transverse connection S3 is fastened to the base body at the lateral supporting members S5, S6 such that said transverse connection S3 connects those ends of the supporting members S5, S6 which are at the front in the direction of travel to each other.

As shown in FIG. 7, the front-end body is brought up to the base body and, by fastening of the connecting plate S2 to the transverse connection S3, is aligned in its entirety in relation to the base body.

After the front-end body is fastened, a radiator unit (not shown in FIG. 7) is intended to be accommodated in the receiving space located under the connecting plate S2.

Owing to the fact that the connecting plate S2 spans the receiving space, the latter is bounded in the vertical direction of the front-end body by the connecting plate S2.

Firstly, this necessarily determines the installation sequence of the radiator unit and of the front-end body because the receiving space is no longer accessible after the front end is fastened. For this reason, the radiator unit has to be mounted before the front-end body is fastened. As becomes plain therefrom, a repair-induced replacement of the radiator unit can subsequently be carried out only by complete release of the entire front end.

Secondly, the known front-end body can be used only conditionally as standard for various types of vehicle and/or series of vehicles since, in particular, the connecting plate S2 frequently requires a different vehicle-induced configuration, which, in turn, involves adaptations of other elements of the front-end body.

Finally, the connecting plate S2 also bounds the receiving space available for the radiator unit in the vertical direction of the front-end body in such a manner that the maximally useable size of the radiator unit is reduced.

It is the object of the invention to provide an improved front-end body for the construction of a modular front end, which, in particular, permits more flexible usability and installation.

This and other objects are achieved by a front-end body according to the invention for the construction of a front end of a motor vehicle, wherein the front-end body includes a first lateral supporting element and a second lateral supporting element which are fastenable to a reference strut, which is provided on a base body, in order to align the front-end body with respect to the base body. A transverse strut arrangement connects the first lateral supporting element and the second lateral supporting element in such a manner that a receiving space which is open in the vertical direction of the front-end body and is intended for receiving a unit, in particular a radiator, is formed between the first lateral supporting element and the second lateral supporting element. A stability element is fastened releasably at one end to the transverse strut arrangement and can be fastened indirectly or directly at the other end to the base body.

The front-end body according to the invention is, in particular, a body constructing the basic structure/basic construction of a modular front end. The fully mounted front end overall forms a module which closes off the front side of a motor vehicle and forms or constitutes the outer skin of the front region of the motor vehicle. For example, a front end based on the front-end body according to the invention includes the headlights, bumper, the radiator grill, the engine hood lock, etc.

The supporting elements in particular form the lateral boundary of the receiving space and are connected to the transverse strut arrangement in such a manner that the receiving space of the front-end body is open in the vertical direction, i.e. the transverse strut arrangement and the lateral supporting elements merely encircle the receiving space and do not bound the latter in the vertical direction of the front-end body. By this means, the front-end body can be brought up to the base body irrespective of the configuration of the installed radiator unit and can be used for several different types of vehicles.

Furthermore, the installation sequence becomes more flexible by means of the configuration of the front-end body. In principle, the front-end body can be fastened first of all to the base body, and then the radiator unit can be inserted into the receiving space. However, the installation can also be implemented vice versa.

The rigidity of the front end is furthermore determined by the stability element which is fastened releasably to the transverse strut arrangement and can be fastened either indirectly, for example via the reference strut, or directly to the base body. As mentioned, the transverse strut arrangement and the lateral supporting elements can be dimensioned for numerous types of vehicles. Only the stability element which is fastened releasably to the transverse strut arrangement has to be adapted to the respective type of vehicle or the configuration of the radiator unit. Consequently, the front-end body can be used more flexibly for different types of vehicle and model series.

Furthermore, the construction space is optimized with respect to the receiving space which is available for the radiator unit. The lateral supporting elements and the transverse strut arrangement do not block the receiving space in the vertical direction of the front-end body, and therefore the maximum dimensions of the radiator unit in the vertical direction are increased. The stability element is preferably adapted to the installed radiator unit and extends over the unit or the receiving space making high use of the construction space.

The front-end body according to the invention preferably has the reference strut which is intended to be leant against the base body before the front-end body is installed and to be fastened to the base body. The stability element is fastened releasably at one end to the transverse strut arrangement and at the other end to the reference strut.

Owing to the fact that the front-end body according to the invention preferably comprises the reference strut to be fastened to the base body, the front-end body can be readily oriented in relation to the base body and fastened thereto. Owing to the releasable connection between the stability element and the transverse strut arrangement or the reference strut, the receiving space in which, for example, the radiator unit is located after the front-end body is installed remains easily accessible. This is advantageous in particular in the case of a repair-induced interchanging of the radiator unit.

The stability element is preferably structured such that the stability element has certain force transmission and deformation properties.

For example, this can be achieved in the case of a plate-like stability element by means of embossing and/or by means of forming stronger and weaker regions in terms of material.

As already mentioned, the front-end body according to the invention can be adapted to different types of vehicle or model series merely by interchanging the stability element. Furthermore, requirements regarding the deformation behavior in the event of an accident or requirements regarding the protection of pedestrians can also readily be achieved.

The reference strut preferably has fastening portions to which struts running in an engine compartment of the base body can be fastened.

Forces can be introduced into the base body via the further struts to be fastened to the reference strut, which improves the stability properties of the front-end body and, with respect to a lightweight construction to be sought, not least ensures that various elements of the front-end body can be designed to be lighter in terms of weight.

The front-end body according to the invention preferably comprises a first fastening element and a second fastening element which are provided for holding the unit and which extend into the receiving space, wherein the first and second fastening elements are fastened to the stability element. The fastening elements are, for example, fastened releasably to the stability element.

This manner of fastening the unit, in particular the radiator unit, is advantageous because the fastening elements are attached to the stability element. In this respect, it follows therefrom that again only the stability element has to be adapted to different types of vehicle or radiator units. The other elements of the front-end body can remain unchanged.

However, it is also possible to attach the fastening elements to the lateral supporting elements.

Since the fastening elements for holding the unit, in particular the radiator unit, can also be fastened to the lateral supporting elements, it is possible to configure the stability element in a highly vehicle-specific manner. This is because, in this case, it is not absolutely necessary for the stability element to extend over the radiator unit at the fastening portions. This is advantageous, in particular, for the use of the front-end body in various types of vehicles, such as sedans or SUVs.

For example, the stability element can be a stability strut which, starting from the transverse strut arrangement, extends in a V-shaped manner, is fastened releasably at one end to the transverse strut arrangement and is dimensioned such that it is intended to be fastenable at the other end in a region of suspension strut domes of the base body.

The stability element is preferably a stability strut which has an M-shaped course and, starting from the transverse strut arrangement, extends in the direction of the suspension strut domes of the base body and from there in the direction of the front supporting members of the base body.

The stability strut is preferably fastened releasably at one end to the transverse strut arrangement and is intended to be fastened at the other end both in the region of the suspension strut domes of the base body and to the front supporting members of the base body.

In addition, M- and V-shaped stability struts can also be fastened to the reference strut.

Two preferred embodiments of the front-end body according to the invention will be described below with reference to the attached drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
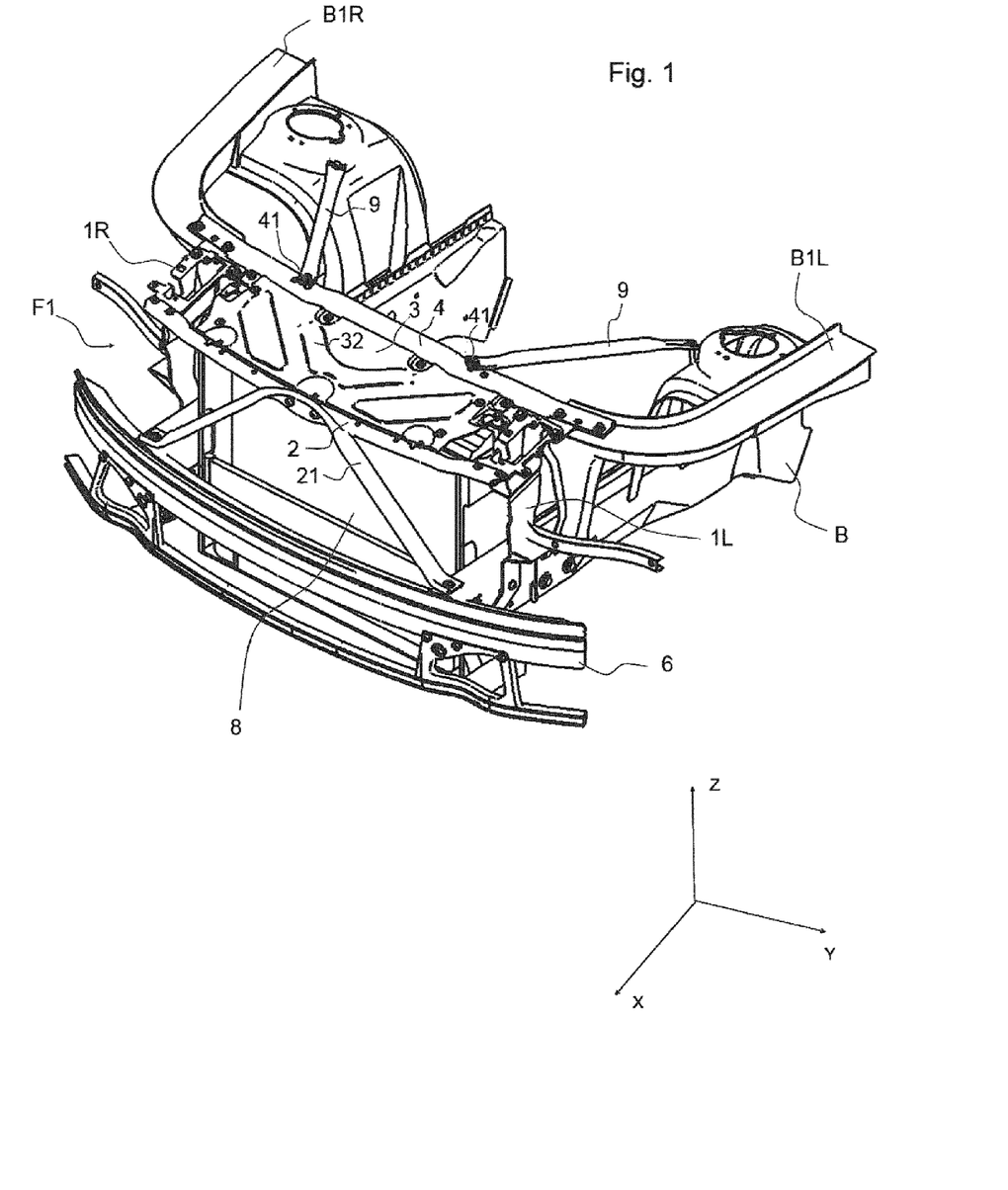
FIG. 1 shows a first preferred embodiment of the front end body according to the invention in a mounted state, wherein a radiator unit is accommodated within a receiving space.
Figure 2:
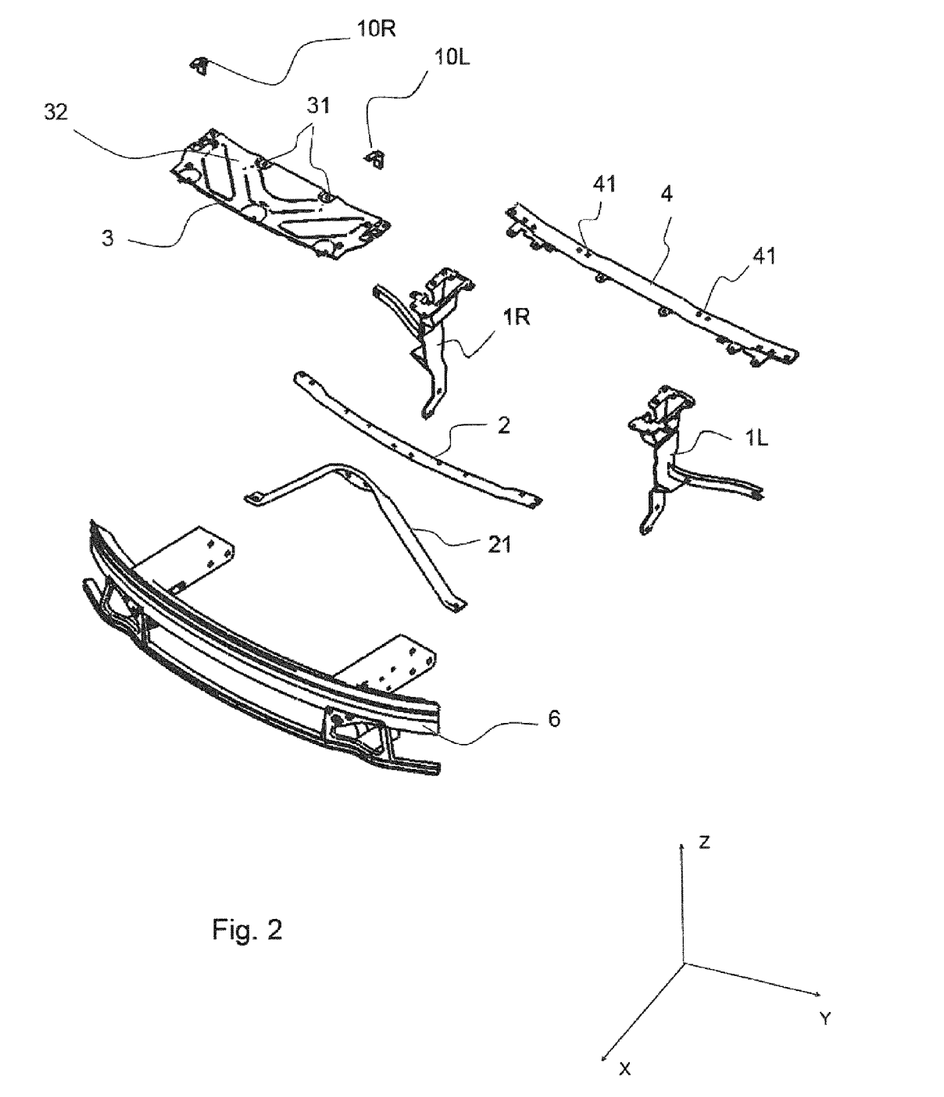
FIG. 2 shows the first embodiment of the front end body according to the invention in an exploded view.

FIG. 1 shows a first preferred embodiment of the front end body F1 according to the invention, which is fastened to a base body B. FIG. 2 shows the elements of the front end body F1 in an exploded state.

The X direction illustrated in FIGS. 1 and 2 corresponds to the main direction of travel of the motor vehicle to be completed and consequently to the direction in which the front side of the front end body F1 faces.

The Y direction shown corresponds to the width direction of the motor vehicle to be completed or the front end body F1, i.e. the left side of the front end body F1 faces in the positive Y direction and the right side of the front end body F1 faces in the negative Y direction.

The Z direction shown corresponds to the vertical direction of the motor vehicle to be completed or the front end body F1. The upper side of the front end body F1 faces in this direction.

The front end body F1 includes a first lateral supporting element 1L which is arranged on the left side of the front end body F1 and a second lateral supporting element 1R which is arranged on the right side of the front end body F1. The first and second supporting elements 1L, 1R are fastened at the upper end thereof facing the base body B to a reference strut 4 (also explained below) for the installation and alignment of the front end body 1.

Those ends of the first and second supporting elements 1L, 1R which face in the main direction of travel or X direction are connected at the upper end thereof in the Z direction to each other via a transverse strut arrangement 2.

Starting from a central portion of the transverse strut arrangement 2, a V shaped strut 21 extends to a crash system 6 which is located in the lower region of the front end body F1 and to which the V shaped strut is likewise fastened.

The lateral supporting elements 1L, 1R together with the transverse strut arrangement 2 form a receiving space in which, in FIG. 1, a radiator unit 8 of an engine (not illustrated) is accommodated.

For the installation and fastening of the front end body F1, a reference strut 4 is fastened both to a left supporting member B1L and also to a right supporting member B1R of the base body B. As shown in FIG. 1, the front end body F1 according to the invention is brought up to the reference strut 4 and the first and second lateral supporting elements 1L, 1R are connected to the reference strut 4 via a screw connection.

As is apparent from the preceding, the receiving space for the radiator unit 8 is determined by the first and second lateral supporting elements 1L, 1R and the transverse strut arrangement 2, wherein the receiving space is open in the vertical direction of the front-end body F1 or Z direction and is not blocked by the lateral supporting elements 1L, 1R and the transverse strut arrangement 2. To this extent, the front end body F1 can be brought in the Z direction up to the base body and fastened thereto irrespective of the dimensions of the radiator unit 8. For this reason, the front end body F1 can be used for different types of vehicle or model series irrespective of the radiator unit 8.

As is apparent from FIGS. 1 and 2, the receiving space according to the first embodiment of the front end body F1 is spanned by a plate like stability element 3 which is fastened releasably at one end to the transverse strut arrangement 2 and at the other end to the reference strut 4 via screw connections 31.

The stability element 3 is preferably dimensioned and structured in such a manner that it has a certain force transmission behavior between the transverse strut arrangement 2 and the reference strut 4. As is illustrated in FIGS. 1 and 2, the plate like stability element 3 has a V shaped region 32 which is formed by way of embossing and/or by the formation of regions which are stronger and weaker in terms of material. Forces which act on the front end body F1 in the negative X direction, for example in the event of an accident, are introduced into the base body B laterally via the stability element 3 and indirectly via the reference strut 4.

Depending on the type of vehicle, for example sedan or SUV, this structuring of the stability element 3 is designed in such a manner that the front end body also meets certain requirements, for example regarding protection of pedestrians.

In order to increase and improve the introduction of a force acting on the front end body F1 into the base body B, additional struts 9 can also be provided. The struts 9 are fastened at one end to fastening portions 41 of the reference strut 4 and at the other end in regions of the suspension strut domes of the base body B.

As is apparent from the preceding description, the front end body F1 can be used for many types of vehicle and model series without serious alterations to the individual elements being necessary. Only the stability element 3 has to be adapted depending on the dimensioning of the radiator unit and the necessary stability properties.

Furthermore, considerable advantages are also afforded in the installation of the front end body according to the invention, which will be explained with respect to FIGS. 3 and 4.

Figure 3:
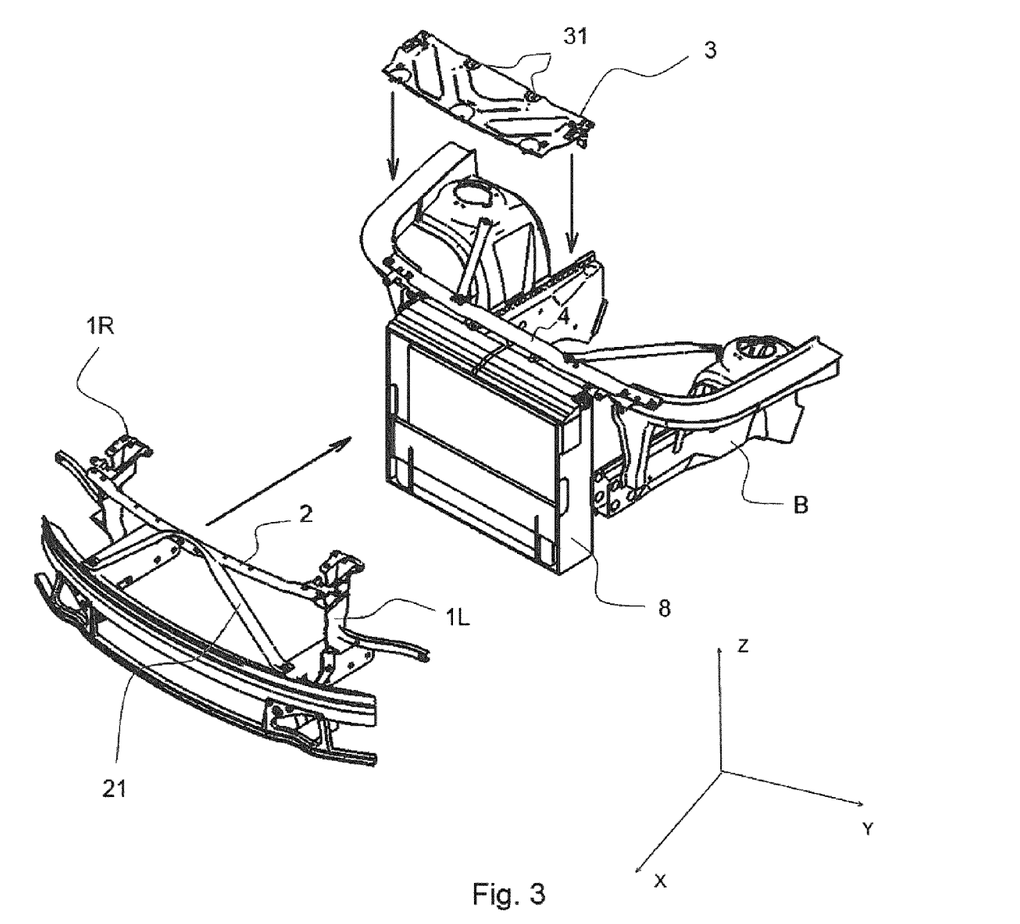
FIG. 3 shows an installation operation of the first embodiment of the front end body, wherein the stability element is fastened to the base body after the front end body has been brought up.

As is apparent in FIG. 3, the front-end body F1, without the stability element 3 fastened, can be brought up to the base body B in such a manner that the first and second lateral supporting elements 1L, 1R and the transverse strut arrangement 2 surround or encircle the illustrated radiator unit 8. In general, the radiator unit 8 then does not have to be mounted at this time. It is entirely possible to bring the front end body F1, without the stability element 3 fastened, up to the base body B and then to insert the radiator unit 8 into the receiving region which is open or is not blocked in the Z direction.

After the first and second lateral supporting element 1L, 1R have been fastened to the reference strut 4 and the radiator unit 8 is in the receiving region, the stability element 3 can subsequently be fastened to the transverse strut arrangement 2 and to the reference strut 4 via screw connections 31.

Finally, the radiator unit 8 is also fastened to the stability element 3 with fastening elements 10L, 10R which are explained later.

In contrast to the installation steps described with respect to FIG. 3, the front end body F1 according to the invention can also be mounted as follows.

Figure 4:
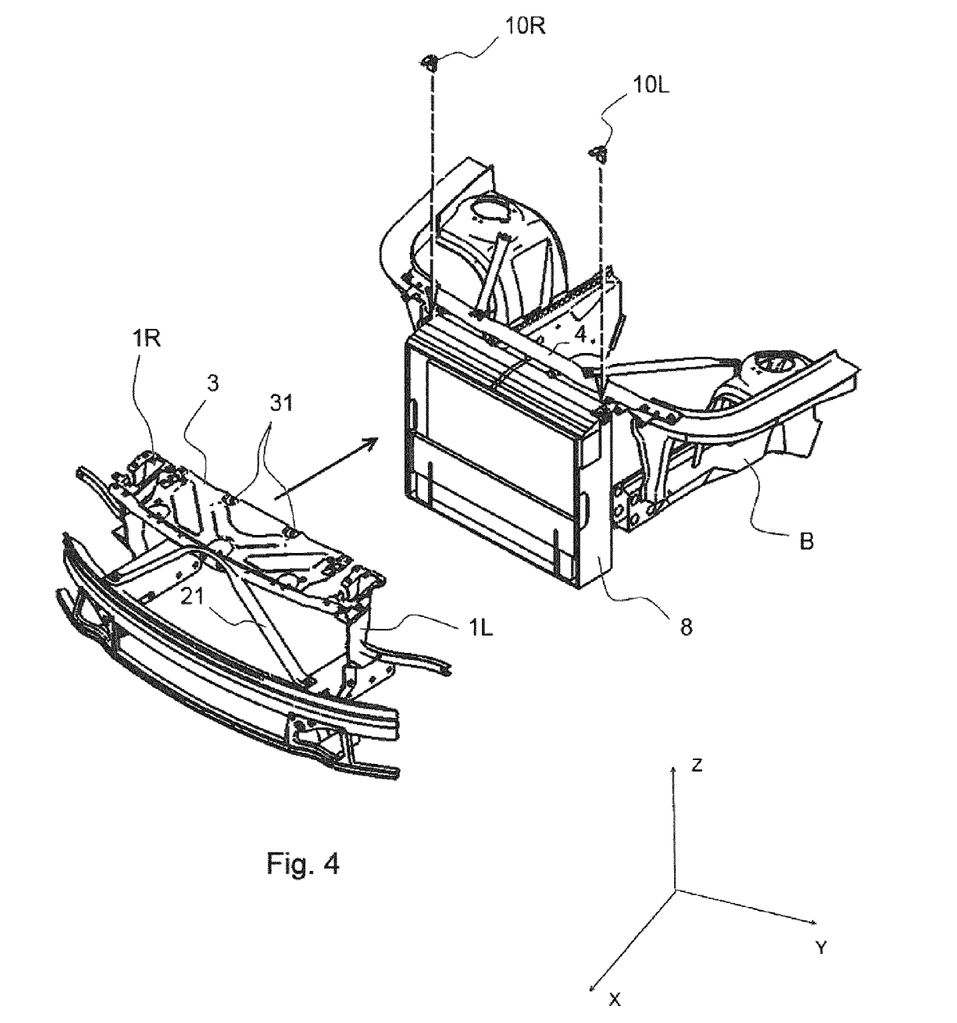
FIG. 4 shows a further installation operation of the first embodiment of the front end body, wherein the stability element has already been fastened to the base body before the front end body is brought up.

FIG. 4 shows the front end body F1 with a fastened stability element 3. Again, the radiator unit 8 is already mounted on the base body B, wherein the radiator unit is dimensioned in the Z direction in such a manner that the front end body F1, with the fastened stability element 3, can be brought up to the base body B.

When the front-end body F1 has been brought up to the base body B and the radiator unit 8 is accommodated in the receiving space of the front end body F1, the lateral supporting elements 1L, 1R and the stability element 3 can be fastened to the reference strut 4 of the front end body F1 via the screw connections.

In a further installation step, the radiator unit 8 is fastened to the stability element 3 with the fastening elements 10.

As is apparent from the installation steps described with respect to FIGS. 3 and 4, the front-end body F1 can be mounted differently depending on the dimensioning of the radiator unit 8, and therefore no necessary adaptations of a production line for producing different types of vehicles arise in respect of the installation time of the radiator unit 8 or of the front end body F1 if the radiator units are designed differently in a vehicle specific manner.

In addition, the front end body according to the invention is also advantageous to the effect that a repair induced interchanging of the radiator unit can easily be carried out by removing the stability element 3.

Figure 5:
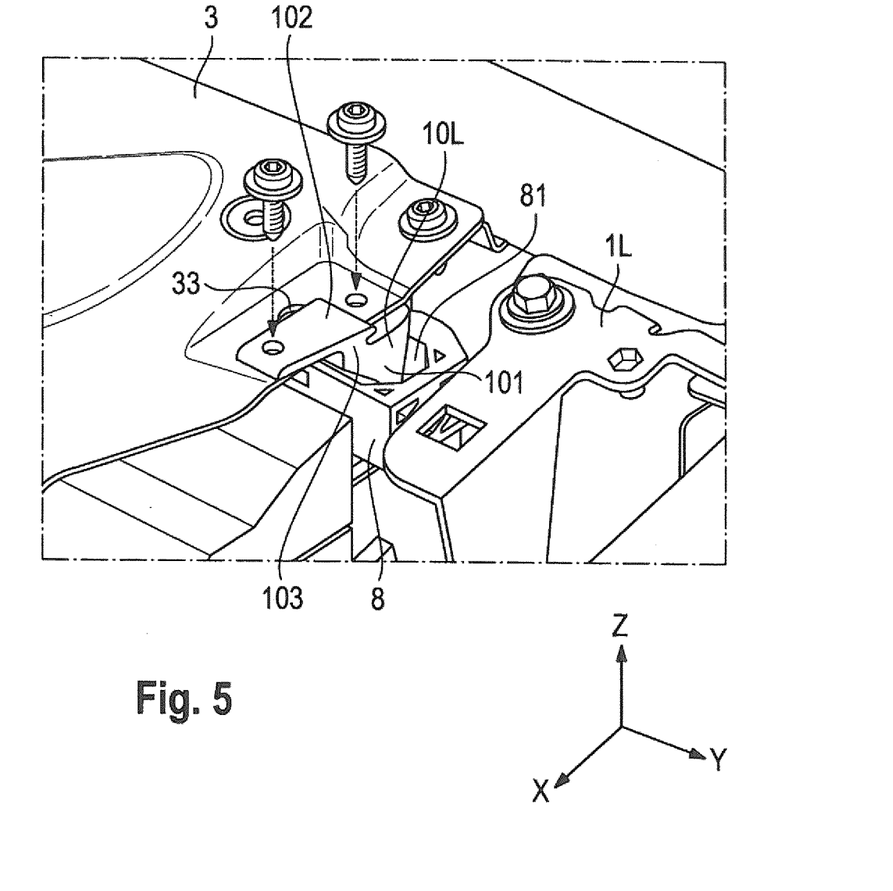
FIG. 5 shows an enlarged detail of a connection of the stability element to the radiator unit arranged therebelow.

FIG. 5 shows an enlarged partial view of the left upper side of the front end body F1, wherein the left connection between the stability element 3 and the radiator unit 8 can readily be seen.

The fastening element 10L comprises an extended portion 101 which is inserted into a corresponding receptacle 81 of the radiator unit 8. On the upper side assigned to the stability element 3, the fastening element 10L comprises a T-shaped extension 102. A tapering portion 103 of the T shaped extension 102 is inserted into a slot 33 formed in the stability element 3, as a result of which the stability element 3 meshes together with the fastening element 10L. In order to fix the fastening element 10L to the stability element 3, two screw connections are provided, as shown in FIG. 5.

In order to release the stability element 3 or the fastening element 10L, the fastening element 10L can be offset laterally in the receptacle 81 in relation to the stability element 3, as a result of which the slot 33 formed in the stability element 3 releases the tapering portion 103 of the fastening element 10L.

The fastening element 10R and the corresponding slot 33 of the right side of the front end body F1 are constructed in an identical manner.

As is apparent from the explanation with regard to FIG. 5, the fastening element 10L can easily be fastened to the stability element 3 either after the stability element 3 is fastened or before the stability element 3 is fastened, and therefore the installation steps described with respect to FIGS. 3 and 4 can readily be carried out.

Figure 6:
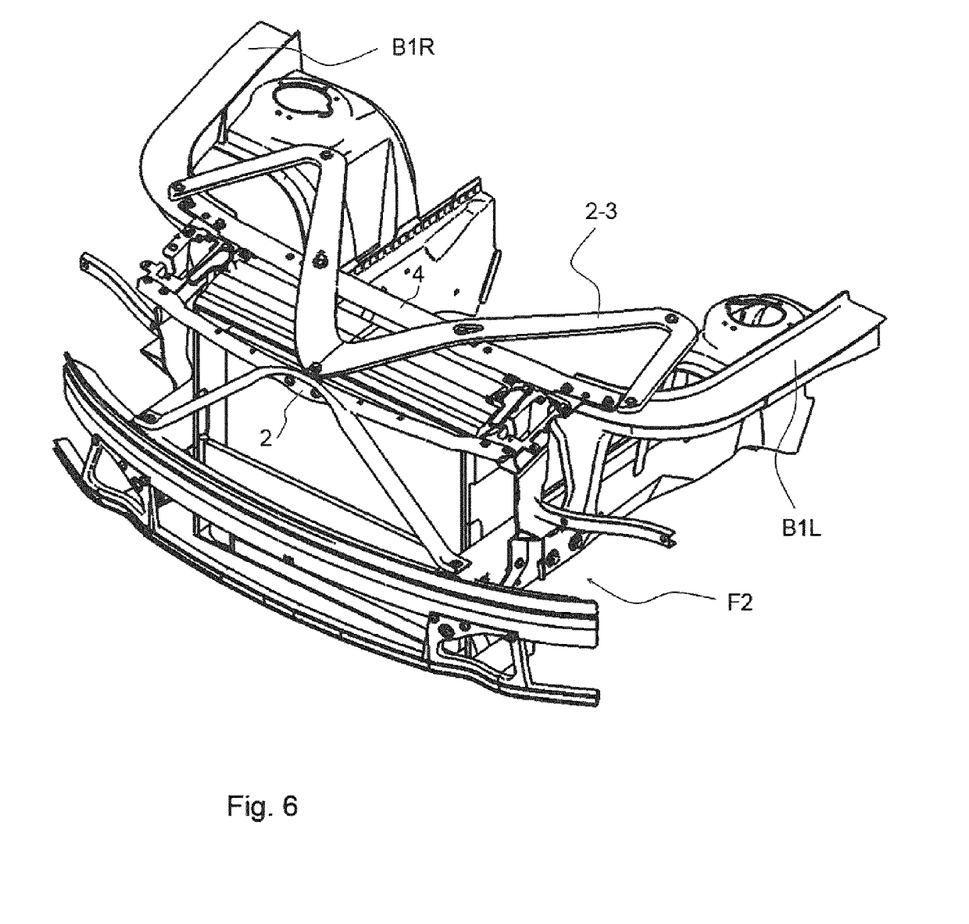
FIG. 6 shows a second preferred embodiment of the front end body according to the invention.

A second preferred embodiment of the front end body according to the invention will be described with respect to FIG. 6. The front end body F2 according to the second preferred embodiment of the invention is identical to that of the first preferred embodiment except for the design of the stability element and the fastening elements, and therefore elements which correspond will not be explained once again.

In the second preferred embodiment, the stability element is designed as a stability strut 2-3. The stability strut 2-3 is M or W shaped and is fastened to the central portion of the transverse strut arrangement 2. Starting from the central portion, the stability strut 2-3 extends in the direction of the regions of the suspension strut domes and from said regions to the front supporting members B1L, B1R of the base body B.

On the part of the base body B, the stability strut 2 3 is fastened to the reference strut 4, in the region of the suspension strut domes and to the supporting members B1L, B1R, preferably by use of screw connections.

Since the stability strut 2-3 in the case of the second preferred embodiment does not extend over the receptacles 81 of the radiator unit 8, the fastening elements 10L, 10R are firmly screwed to the lateral supporting elements 1L, 1R.

The stability elements 3, 2-3 of the first and second preferred embodiment are preferably formed from a fiber/plastic composite and/or a metal alloy, such as, for example, an aluminum alloy.

The other remaining elements are preferably formed from a metal alloy, in particular an aluminum alloy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A front-end body for constructing a front end of a motor vehicle, the front-end body comprising:
a first lateral supporting element and a second lateral supporting element, which first and second lateral supporting elements are fastenable to a transverse extending reference strut provided on a base body in order to align the front-end body with the base body;
a transverse strut arrangement connecting upper areas of the first lateral supporting element and the second lateral supporting element such that a receiving space, which is open in a vertical direction of the front-end body, extends downward from the transverse strut arrangement and is configured for receiving a unit, is formed between the first lateral supporting element and the second lateral supporting element; and
a stability element fastened releasably at one end to the transverse strut arrangement and fastenable indirectly or directly at the other end to the base body.

2. The front-end body according to claim 1, wherein:
the reference strut is intended to be fastened to the base body before the front-end body is installed, and
the stability element is fastened releasably at one end to the transverse strut arrangement and at the other end to the reference strut.

3. The front-end body according to claim 2, wherein the stability element is configured such that the stability element has defined force transmission properties.

4. The front-end body according to claim 1, wherein the stability element is configured such that the stability element has defined force transmission properties.

5. The front-end body according to claim 1, wherein the reference strut has fastening portions to which struts extending in an engine compartment of the base body are fastenable.

6. The front-end body according to claim 3, wherein the reference strut has fastening portions to which struts extending in an engine compartment of the base body are fastenable.

7. The front-end body according to claim 2, further comprising:
a first fastening element and a second fastening element which are provided for holding the unit and extend in the receiving space, wherein
the first and second fastening element are fastened to the stability element.

8. The front-end body according to claim 6, further comprising:
a first fastening element and a second fastening element which are provided for holding the unit and extend in the receiving space, wherein
the first and second fastening element are fastened to the stability element.

9. The front-end body according to claim 2, further comprising:
a first fastening element and a second fastening element which are provided for holding the unit and extend in the receiving space, wherein
the first and second fastening elements are fastened to the lateral supporting elements.

10. The front-end body according to claim 6, further comprising:
a first fastening element and a second fastening element which are provided for holding the unit and extend in the receiving space, wherein
the first and second fastening elements are fastened to the lateral supporting elements.

11. The front-end body according to claim 1, wherein the stability element is a stability strut having an M-shaped course.

12. The front-end body according to claim 2, wherein the stability element is a stability strut having an M-shaped course.

13. The front-end body according to claim 11, wherein the stability strut is fastened releasably to the transverse strut arrangement and is dimensioned such that it is intended to be fastenable in a region of suspension strut domes of the base body and to front lateral supporting members.

14. The front-end body according to claim 12, wherein the stability strut is fastened releasably to the transverse strut arrangement and is dimensioned such that it is intended to be fastenable in a region of suspension strut domes of the base body and to front lateral supporting members.

15. The front-end body according to claim 13, further comprising:
a first fastening element and a second fastening element which are provided for holding the unit and extend in the receiving space, wherein
the first and second fastening element are fastened to the lateral supporting elements.

16. The front-end body according to claim 14, further comprising:
a first fastening element and a second fastening element which are provided for holding the unit and extend in the receiving space, wherein
the first and second fastening element are fastened to the lateral supporting elements.

17. The front-end body according to claim 1, wherein the unit is a radiator.

18. The front-end body according to claim 7, wherein the unit is a radiator.

19. The front-end body according to claim 9, wherein the unit is a radiator.

20. The front-end body according to claim 15, wherein the unit is a radiator.

* * * * *